US010516743B1

(12) United States Patent
Qin et al.

(10) Patent No.: US 10,516,743 B1
(45) Date of Patent: Dec. 24, 2019

(54) SYSTEMS AND METHODS FOR FACILITATING PORTABLE USER SESSIONS

(71) Applicant: Dell Software Inc., Aliso Viejo, CA (US)

(72) Inventors: Yinghua Qin, Zhuhai (CN); Shengzhi Liu, Zhuhai (CN)

(73) Assignee: Quest Software Inc., Aliso Viejo, CA (US)

( * ) Notice: Subject to any disclaimer, the term of this patent is extended or adjusted under 35 U.S.C. 154(b) by 281 days.

(21) Appl. No.: 14/666,410

(22) Filed: Mar. 24, 2015

(51) Int. Cl.
*H04L 29/08* (2006.01)
*H04L 29/06* (2006.01)

(52) U.S. Cl.
CPC ............ *H04L 67/148* (2013.01); *H04L 67/42* (2013.01)

(58) Field of Classification Search
CPC .............................. H04L 67/148; H04L 67/42
USPC ........................................................ 709/227
See application file for complete search history.

(56) References Cited

U.S. PATENT DOCUMENTS

| | | | | |
|---|---|---|---|---|
| 6,748,420 B1 * | 6/2004 | Quatrano | .......... | G06F 17/30873 707/E17.111 |
| 7,058,600 B1 * | 6/2006 | Combar | ............ | G06F 17/30893 379/114.03 |
| 7,546,370 B1 * | 6/2009 | Acharya | ........... | G06F 17/30864 709/223 |
| 7,631,193 B1 * | 12/2009 | Hoffman | ................. | G06F 21/32 382/115 |
| 8,090,877 B2 * | 1/2012 | Agarwal | ............. | H04L 63/0281 709/219 |
| 8,495,195 B1 * | 7/2013 | Abidogun | ............... | H04L 67/04 709/223 |
| 8,875,243 B1 * | 10/2014 | Cherukumudi | ....... | H04L 63/168 713/168 |
| 9,514,459 B1 * | 12/2016 | Doshi | .................. | G06Q 20/383 |
| 2002/0007317 A1 * | 1/2002 | Callaghan | .............. | G06Q 30/02 705/26.8 |

(Continued)

FOREIGN PATENT DOCUMENTS

WO  WO-9964967 A1  12/1999
WO  WO-2007054761 A1  5/2007

OTHER PUBLICATIONS

Brinkmann, Martin; "TabCloud: Cross-Browser Cloud-Based Session Management"; www.ghacks.net; Mar. 18, 2013; 4 pages.

(Continued)

*Primary Examiner* — Philip J Chea
*Assistant Examiner* — Wing Ma
(74) *Attorney, Agent, or Firm* — Winstead PC

(57) ABSTRACT

In an embodiment, a method is performed by a computer system. The method includes automatically receiving, from an agent on a client device that is physically distinct from the computer system, a cookie corresponding to an active user session on a website. The active user session is previously established on the website in response to the website receiving valid user credentials from the client device. The method also includes storing the cookie in memory. In addition, the method includes, via the cookie, collecting information from the website over the active user session, thereby reusing the active user session. Further, the method includes periodically sending a dummy request comprising the cookie to the website, thereby preserving the active user session.

20 Claims, 4 Drawing Sheets

(56) References Cited

U.S. PATENT DOCUMENTS

| | | | |
|---|---|---|---|
| 2002/0133540 A1* | 9/2002 | Sears, Jr. | G06F 17/30867 709/203 |
| 2002/0143861 A1* | 10/2002 | Greene | G06Q 30/04 709/203 |
| 2002/0184338 A1* | 12/2002 | Haines | G06Q 30/02 709/218 |
| 2003/0061275 A1* | 3/2003 | Brown | H04L 67/02 709/203 |
| 2004/0049673 A1* | 3/2004 | Song | G06F 17/3089 713/150 |
| 2004/0054784 A1* | 3/2004 | Busch | G06F 17/3089 709/228 |
| 2004/0143669 A1* | 7/2004 | Zhao | H04L 29/06 709/228 |
| 2006/0009213 A1* | 1/2006 | Sturniolo | H04W 8/02 455/426.1 |
| 2006/0123119 A1* | 6/2006 | Hill | H04L 67/14 709/227 |
| 2009/0024737 A1* | 1/2009 | Goldspink | G06F 11/3495 709/224 |
| 2009/0055891 A1* | 2/2009 | Okamoto | H04L 63/0227 726/1 |
| 2010/0138485 A1* | 6/2010 | Chow | H04L 67/2842 709/203 |
| 2010/0281008 A1* | 11/2010 | Braunwarth | G06F 17/30867 707/705 |
| 2011/0238975 A1* | 9/2011 | Amemiya | H04W 4/20 713/150 |
| 2012/0036178 A1* | 2/2012 | Gavini | G06F 9/5027 709/203 |
| 2012/0204144 A1* | 8/2012 | Fioritoni | H04L 67/02 717/120 |
| 2012/0210243 A1* | 8/2012 | Uhma | G06F 17/30893 715/744 |
| 2013/0246563 A1 | 9/2013 | Cardozo | |
| 2014/0123033 A1* | 5/2014 | Uhma | G06F 17/30893 715/753 |
| 2014/0189839 A1* | 7/2014 | Jezek | H04L 63/0815 726/8 |
| 2014/0359067 A1* | 12/2014 | Zises | G06F 21/32 709/217 |
| 2015/0113383 A1* | 4/2015 | Yuhan | G06F 17/2247 715/234 |
| 2015/0134956 A1* | 5/2015 | Stachura | H04L 63/0807 713/168 |
| 2015/0373150 A1* | 12/2015 | Wen | H04L 67/02 709/213 |
| 2016/0182627 A1* | 6/2016 | Navanageri | H04L 67/1095 709/219 |
| 2016/0300202 A1* | 10/2016 | Xu | G06Q 20/10 |
| 2017/0034210 A1* | 2/2017 | Talmor | H04L 67/02 |
| 2017/0093835 A1* | 3/2017 | Whiteside | H04L 63/08 |

OTHER PUBLICATIONS

Maxthon; "Maxthon's Cloud Browser Sets You Free"; www.maxthon.com; 2013; 6 pages.

Google Labs; "Google Browser Sync: Frequently Asked Questions"; http://www.google.com/tools/firefox/browsersync/faq/html; 2008; 3 pages.

Mertz, David; "Charming Python: Easy Web Data Collection with Mechanize and Beautiful Soup"; www.ibm.com; Nov. 24, 2009; 7 pages.

Stack Overflow; "Python—Resume Web Session from urllib2 after Manual Browser Login"; http://stackoverflow.com; Sep. 2012; 2 pages.

Quora; "Google Chrome: Why Doesn't Chrome Keep Cookies in the Cloud like it Does with Bookmarks?"; www.quora.com; 2013; 3 pages.

* cited by examiner

US 10,516,743 B1

SYSTEMS AND METHODS FOR FACILITATING PORTABLE USER SESSIONS

BACKGROUND

Technical Field

The present disclosure relates generally to network communication and more particularly, but not by way of limitation, to systems and methods for facilitating portable user sessions.

History of Related Art

Web scraping is sometimes used to extract information from websites. When the websites require user credentials to be accessed, however, user credentials generally must be stored. Frequently, however, user credentials for the websites can change or expire. This can hinder web scraping.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In an embodiment, a method is performed by a computer system. The method includes automatically receiving, from an agent on a client device that is physically distinct from the computer system, a cookie corresponding to an active user session on a website. The active user session is previously established on the website in response to the website receiving valid user credentials from the client device. The method also includes storing the cookie in memory. In addition, the method includes, via the cookie, collecting information from the website over the active user session, thereby reusing the active user session. Further, the method includes periodically sending a dummy request comprising the cookie to the website, thereby preserving the active user session.

In one embodiment, an information handling system includes at least one processor. The at least one processor is operable to implement a method. The method includes automatically receiving, from an agent on a client device that is physically distinct from the information handling system, a cookie corresponding to an active user session on a website. The active user session is previously established on the website in response to the website receiving valid user credentials from the client device. The method also includes storing the cookie in memory. In addition, the method includes, via the cookie, collecting information from the website over the active user session, thereby reusing the active user session. Further, the method includes periodically sending a dummy request comprising the cookie to the website, thereby preserving the active user session.

In one embodiment, a computer-program product includes a non-transitory computer-usable medium having computer-readable program code embodied therein. The computer-readable program code is adapted to be executed to implement a method. The method includes automatically receiving, from an agent on a client device, a cookie corresponding to an active user session on a website. The active user session is previously established on the website in response to the website receiving valid user credentials from the client device. The method also includes storing the cookie in memory. In addition, the method includes, via the cookie, collecting information from the website over the active user session, thereby reusing the active user session. Further, the method includes periodically sending a dummy request comprising the cookie to the website, thereby preserving the active user session.

BRIEF DESCRIPTION OF THE DRAWINGS

A more complete understanding of the present disclosure may be obtained by reference to the following Detailed Description when taken in conjunction with the accompanying Drawings wherein.

DETAILED DESCRIPTION

In various embodiments described herein, user sessions with websites and other resources can be reused and restored on physically distinct devices. For purposes of this patent application, a user session refers to an interactive information interchange between a computer and a user. The user session can be established at a certain point in time and torn down at a later point in time if, for example, a certain period of time expires. An active user session, as used herein, refers to an established user session that has not been torn down.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
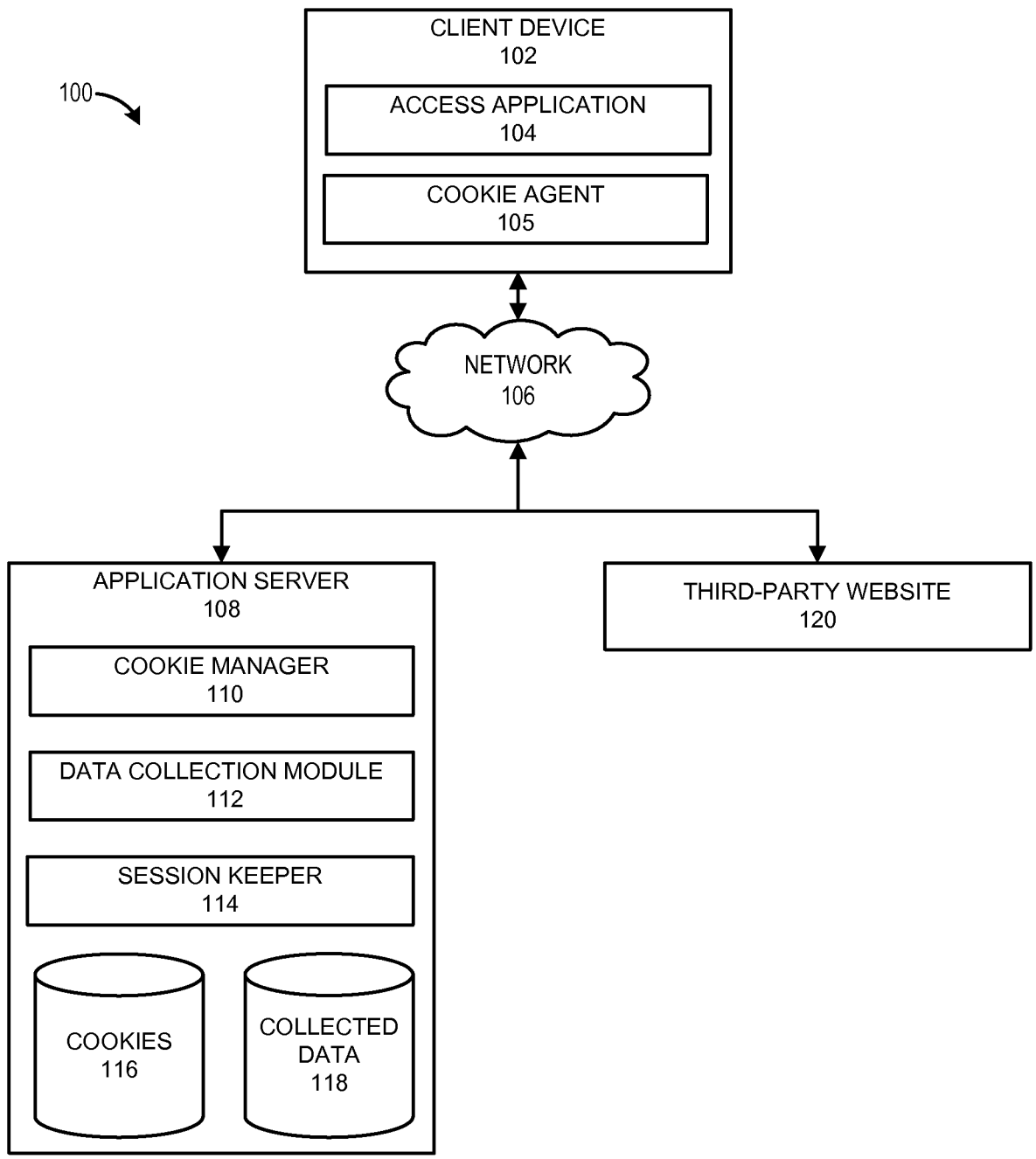
FIG. 1 illustrates an example of a system for facilitating portable user sessions.

FIG. 1 illustrates an example of a system 100 for facilitating portable user sessions. The system 100 includes a client device 102, an application server 108, and a third-party website 120. The client device 102, the application server 108, and the third-party website 120 are each communicably coupled to a network 106 such as, for example, a wide area network (e.g., the Internet), a corporate intranet or extranet, and/or the like.

As shown, the client device 102 is an information handling system that is operable to execute an access application 104 and a cookie agent 105. For purposes of simplicity, only a single client device (i.e., the client device 102) is illustrated in FIG. 1. However, it should be appreciated that the client device 102 can be representative of any number of similar client devices. In a typical embodiment, the access application 104 is representative of a software application that can be used to facilitate locating and/or contacting of resources over the network 106. For example, in some embodiments, the access application 104 can be a platform-specific native application such as a web-browser application.

The third-party website 120 is an example of a resource that can be accessed by the access application 104 over the network 106. In a typical embodiment, the access application 104 is operable to communicate with resources such as the third-party website 120 to establish user sessions thereon. For purposes of the example of FIG. 1, the third-party website 120 can require valid user credentials (e.g., user name, password, etc.) to establish a user session. When a user session is established with the third-party website 120 (e.g., as a result of valid credentials being received), the access application 104 can receive a cookie (e.g., a session cookie), generated by the third-party website 120, that includes, inter alia, identifying information for the user session, a timestamp, information related to when the cookie expires, and/or other information. In many cases, some or all of the information in the cookie can be encrypted. In a typical embodiment, the cookie is stored in the access application 104 during the user session (e.g., during a length of time that a user is browsing the third-party website 120).

In certain embodiments, the cookie agent 105 can detect, or intercept, cookies for potential reuse on devices physically distinct from the client device 102. In some embodiments, such as when the access application 104 is a web browser, the cookie agent 105 can be a browser extension (e.g., a certified browser extension to the access application 104). In other embodiments, such as when the client device 102 is a mobile device (e.g., a smartphone, tablet, wearable computer, etc.), the cookie agent 105 can be a distinct native application (e.g., mobile application) that monitors incoming network traffic on the client device 102 for cookies. As described in greater detail with respect to FIG. 3, cookies detected or intercepted by the cookie agent 105 can be forwarded to the application server 108 for further handling. In various embodiments, the cookie agent 105 can detect and forward all cookies, only cookies relating to a particular resources such as the third-party website 120, only cookies relating to a particular set of resources or websites, and/or the like.

In a typical embodiment, the application server 108 enables reuse of active user sessions that can be established, for example, using physically distinct devices such as the client device 102. In the illustrated embodiment, the application server 108 includes a cookie manager 110, a data collection module 112, a session keeper 114, a data store 116, and a data store 118.

The cookie manager 110 is operable to receive, from client devices such as the client device 102, cookies corresponding to active user sessions. The cookies that are received by the cookie manager 110 can be stored in the data store 116 or in other memory. The cookie manager 110 can in some cases allow cookies stored on the application server 108 to be transferred to the client device 102 and/or to devices or information handling systems that are physically distinct from the client device 102. In these cases, the cookie manager 110 can thereby enable active user sessions to which the transferred cookies correspond to be restored on various other devices. An example of how active user sessions can be restored will be described with respect to FIG. 4.

In certain embodiments, the application server 108 can itself reuse cookies managed by the cookie manager 110. For example, the data collection module 112 can use one or more of these stored cookies, which generally correspond to active user sessions established via physically distinct computing devices, to perform data collection such as web scraping on websites to which they correspond. Information collected or generated by the data collection module 112 can be stored in the data store 118 or in other memory. In some cases, when the data collection module 112 is finished with its data collection relative to a particular active user session, it can instruct, or cause, the cookie manager 110 to delete a corresponding cookie from the data store 116 and/or any other location in memory where the corresponding cookie is stored.

Advantageously, in certain embodiments, the fact that the data collection module 112 reuses stored cookies, which correspond to active user sessions on resources or websites, means that the data collection module 112 can perform data collection without having to provide user credentials or even store user credentials. Rather, in these embodiments, cookies corresponding to active user sessions can be automatically received by the cookie manager 110 from the cookie agent 105 and stored in the data store 116 or other memory. Data collection such as web scraping can occur automatically without the data collection module 112 having to provide user credentials or risk that any such user credentials have expired or changed.

In an example, the third-party website 120 could be a cloud computing platform. According to this example, the cloud computing platform may be able to provide, for particular user accounts, information such as configuration settings, storage availability, network-usage information, and/or the like. For purposes of this example, if the data store 116 includes a cookie corresponding to an active user session on the cloud computing platform, the data collection module 112 could use the cookie to communicate with the cloud computing platform in a fashion that simulates a web browser and thereby collect and store desired data.

The session keeper 114 can be a hardware or software module operable to maintain an active status of cookies (and corresponding user sessions) that are managed, for example, by the cookie manager 110. In certain embodiments, for each cookie managed by the cookie manager 110, the session keeper 114 can send periodic requests (e.g., HTTP requests such as polling requests), which include the cookie, to a resource or website to which the cookie corresponds. Because these periodic requests are typically for the sole purpose of maintaining an active status of the cookie and a corresponding active user session, these requests may be periodically referred to herein as dummy requests. Further examples of operation of the session keeper 114 will be described with regard to FIG. 3.

Figure 2:
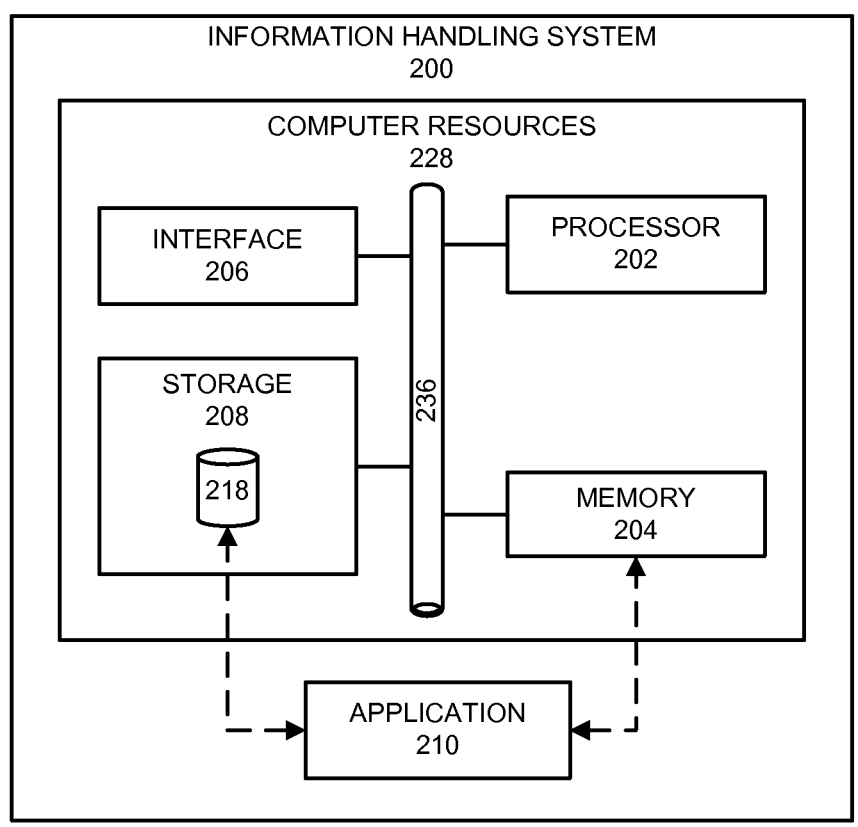
FIG. 2 illustrates an example of an information handling system.

FIG. 2 illustrates an example of an information handling system 200. In various embodiments, one or more information handling systems similar to the information handling system 200 can be included, for example, within the client device 102, the application server 108, computer systems communicating with any of the foregoing, and/or the like. The information handling system 200 includes an application 210 operable to execute on computer resources 228. In particular embodiments, one or more instances of the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks. For example, in certain embodiments, all or part of the application server 108 can reside in a cloud.

In the depicted embodiment, the information handling system 200 includes a processor 202, memory 204, storage 208, interface 206, and bus 236. Although a particular information handling system is depicted having a particular number of particular components in a particular arrangement, this disclosure contemplates any suitable information handling system having any suitable number of any suitable components in any suitable arrangement.

Processor 202 may be a microprocessor, controller, or any other suitable computing device, resource, or combination of hardware, software and/or encoded logic operable to execute, either alone or in conjunction with other components, (e.g., memory 204), the application 210. Such functionality may include providing various features discussed herein. In particular embodiments, processor 202 may include hardware for executing instructions, such as those making up the application 210. As an example and not by way of limitation, to execute instructions, processor 202 may retrieve (or fetch) instructions from an internal register, an internal cache, memory 204, or storage 208; decode and execute them; and then write one or more results to an internal register, an internal cache, memory 204, or storage 208.

In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 208 and the instruction caches may speed up retrieval of those instructions by processor 202. Data in the data caches may be copies of data in memory 204 or storage 208 for instructions executing at processor 202 to operate on; the results of previous instructions executed at processor 202 for access by subsequent instructions executing at processor 202, or for writing to memory 204, or storage 208; or other suitable data. The data caches may speed up read or write operations by processor 202. The TLBs may speed up virtual-address translations for processor 202. In particular embodiments, processor 202 may include one or more internal registers for data, instructions, or addresses. Depending on the embodiment, processor 202 may include any suitable number of any suitable internal registers, where appropriate. Where appropriate, processor 202 may include one or more arithmetic logic units (ALUs); be a multi-core processor; include one or more processors 202; or any other suitable processor.

Memory 204 may be any form of volatile or non-volatile memory including, without limitation, magnetic media, optical media, random access memory (RAM), read-only memory (ROM), flash memory, removable media, or any other suitable local or remote memory component or components. In particular embodiments, memory 204 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 204 may include one or more memories 204, where appropriate. Memory 204 may store any suitable data or information utilized by the information handling system 200, including software embedded in a computer readable medium, and/or encoded logic incorporated in hardware or otherwise stored (e.g., firmware). In particular embodiments, memory 204 may include main memory for storing instructions for processor 202 to execute or data for processor 202 to operate on. In particular embodiments, one or more memory management units (MMUs) may reside between processor 202 and memory 204 and facilitate accesses to memory 204 requested by processor 202.

As an example and not by way of limitation, the information handling system 200 may load instructions from storage 208 or another source (such as, for example, another computer system) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 may execute only instructions in one or more internal registers or internal caches or in memory 204 (as opposed to storage 208 or elsewhere) and may operate only on data in one or more internal registers or internal caches or in memory 204 (as opposed to storage 208 or elsewhere).

In particular embodiments, storage 208 may include mass storage for data or instructions. As an example and not by way of limitation, storage 208 may include a hard disk drive (HDD), a floppy disk drive, flash memory, an optical disc, a magneto-optical disc, magnetic tape, or a Universal Serial Bus (USB) drive or a combination of two or more of these. Storage 208 may include removable or non-removable (or fixed) media, where appropriate. Storage 208 may be internal or external to the information handling system 200, where appropriate. In particular embodiments, storage 208 may be non-volatile, solid-state memory. In particular embodiments, storage 208 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 208 may take any suitable physical form and may comprise any suitable number or type of storage. Storage 208 may include one or more storage control units facilitating communication between processor 202 and storage 208, where appropriate. In addition, in certain embodiments, the application 210 is operable to establish, or update, configurations in a data store 218 on the storage 208. The data store 218 can be a database, flat file, and/or the like.

In particular embodiments, interface 206 may include hardware, encoded software, or both providing one or more interfaces for communication (such as, for example, packet-based communication) among any networks, any network devices, and/or any other computer systems. As an example and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. By way of further example, the interface 206 can utilize communication via various other types of wireless communication such as infrared (IR) communication, radio frequency (RF) communication, communication via direct electrical connections, etc. In general, the information handling system 200 may include any suitable interface 206 for any one or more of these networks, where appropriate.

In some embodiments, interface 206 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 202 to drive one or more of these I/O devices. Interface 206 may include one or more interfaces 206, where appropriate.

Bus 236 may include any combination of hardware, software embedded in a computer readable medium, and/or encoded logic incorporated in hardware or otherwise stored (e.g., firmware) to couple components of the information handling system 200 to each other. As an example and not by way of limitation, bus 236 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 236 may include any number, type, and/or configuration of buses 236, where appropriate. In particular embodiments, one or more buses 236 (which may each include an address bus and a data bus) may couple processor 202 to memory 204. Bus 236 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 202 (such as, for example, one or more internal registers or caches), one or more portions of memory 204, one or more portions of storage 208, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
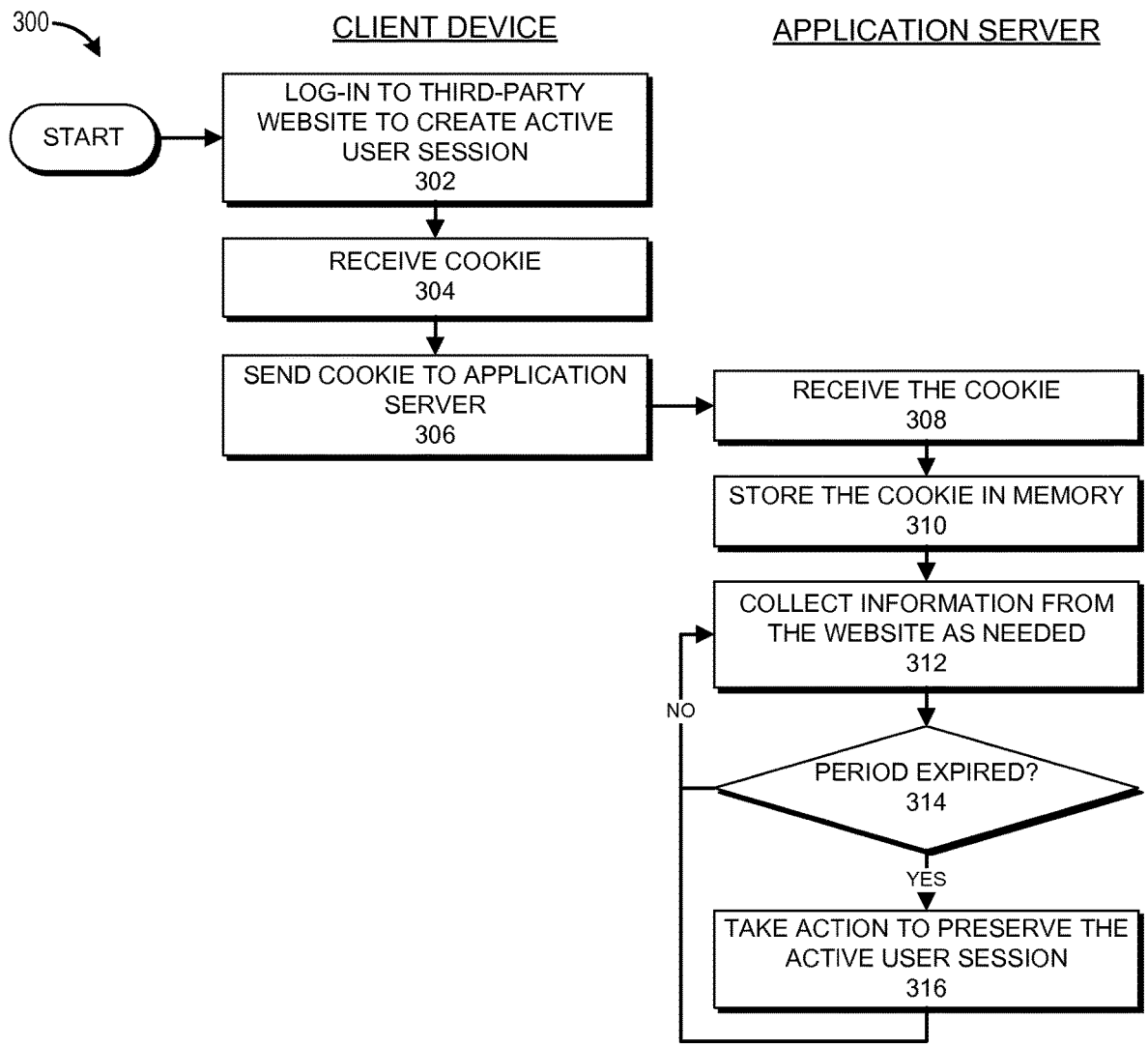
FIG. 3 illustrates a process for reusing active user sessions.

FIG. 3 presents a flowchart of an example of a process 300 for reusing active user sessions. The process 300 can be implemented by any system that can receive or process data. For example, the process 300, in whole or in part, can be implemented by one or more of the client device 102, the access application 104, the cookie agent 105, the application server 108, the cookie manager 110, the data collection module 112, and/or the session keeper 114. In some cases, the process 300 can be performed generally by the system 100. Although any number of systems, in whole or in part, can implement the process 300, to simplify discussion, the process 300 will be described in relation to specific systems or subsystems of the system 100.

At block 302, the client device 102 logs in to the third-party website 120 to create an active user session. For example, the access application 104 can send one or more requests (e.g., HTTP requests) to the third-party website 120. In response, for example, to providing valid user credentials to the third-party website 120, the access application 104 can receive a cookie (e.g., a session cookie), generated by the third-party website 120, which signifies the active user session on the third-party website 120.

At block 304, the cookie agent 105 receives, or detects, the cookie obtained from the third-party website 120 at the block 302. At block 306, the cookie agent 105 automatically sends the cookie to the application server 108. At block 308, the cookie manager 110 of the application server 108 receives the cookie. At block 310, the cookie manager 110 stores the cookie in the data store 116 or in other memory. At block 312, the data collection module 112 collects data from the third-party website 120 as described, for example, with respect to FIG. 1.

At decision block 314, the session keeper 114 determines whether a configurable period of time has expired since the last communication with the third-party website 120 over the active user session. In some cases, the configurable period of time can be based, at least partly, on an expiration time indicated in the cookie. If it is determined at the decision block 314 that the configurable period of time has not expired, the process 300 returns to block 312 and proceeds as described above. Otherwise, if it is determined at decision block 314 that the configurable period of time has expired, the process 300 proceeds to block 316.

At block 316, the session keeper 114 takes action to preserve the active user session on the third-party website 120. For example, the session keeper 114 can send a dummy request that includes the cookie to the third-party website 120. From block 316, the process 300 returns to block 312 and proceeds as described above. In general, the process 300 can continue until data collection is finished, the process 300 is terminated by an administrator or other user, or other stop criteria is satisfied. In certain embodiments, when it is determined that data collection is finished, the cookie manager 110 can delete the cookie, for example, from the data store 116 and/or anywhere else in memory where the cookie is stored.

Figure 4:
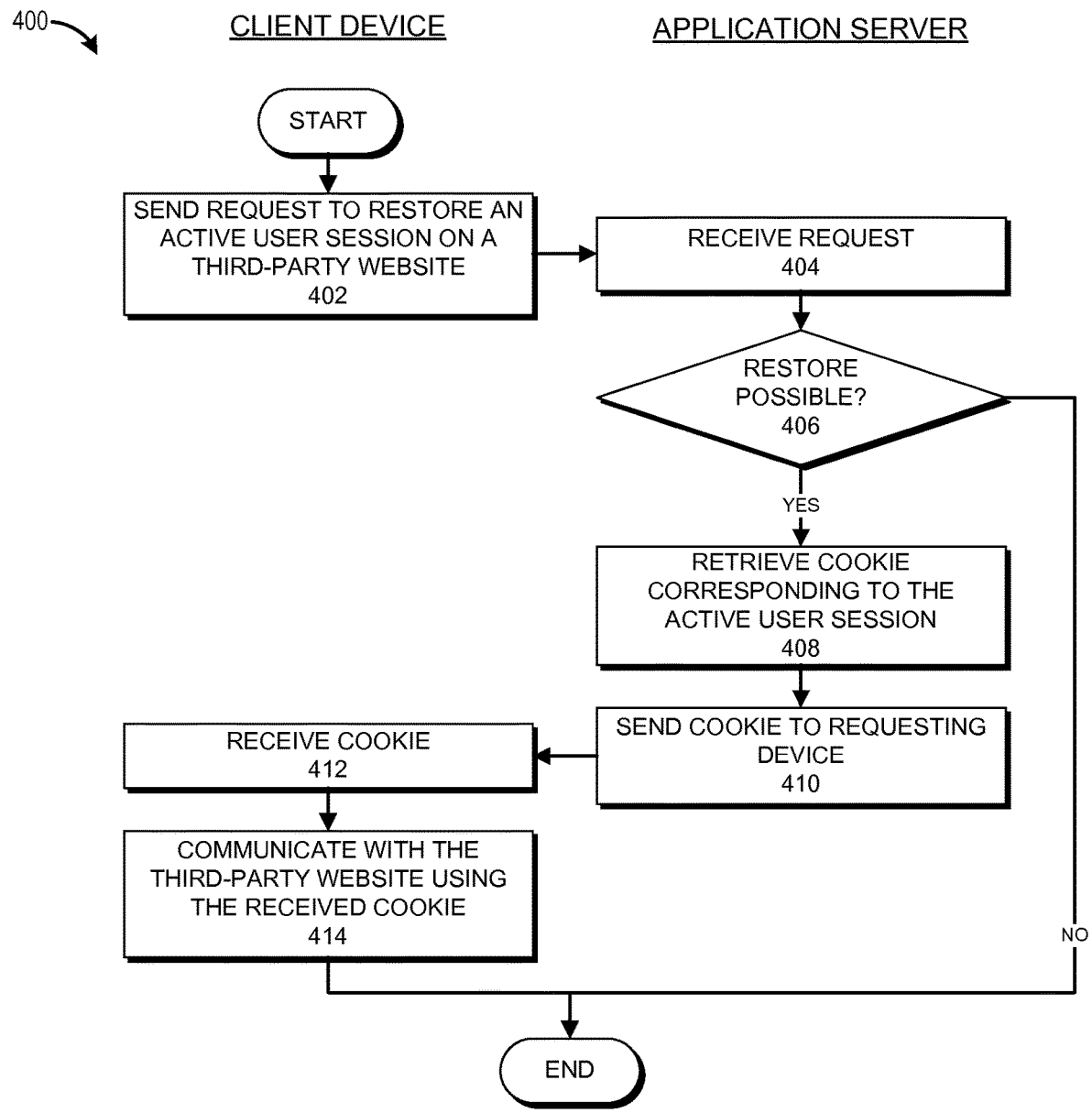
FIG. 4 illustrates a process for restoring active user sessions on various devices.

FIG. 4 presents a flowchart of an example of a process 400 for restoring active user sessions on various devices. The process 400 can be implemented by any system that can receive or process data. For example, the process 400, in whole or in part, can be implemented by one or more of the client device 102, the access application 104, the cookie agent 105, the application server 108, the cookie manager 110, the data collection module 112, and/or the session keeper 114. In some cases, the process 400 can be performed generally by the system 100. Although any number of systems, in whole or in part, can implement the process 400, to simplify discussion, the process 400 will be described in relation to specific systems or subsystems of the system 100.

At block 402, the client device 102 sends, to the application server 108, a request to restore an active user session on the third-party website 120. In various embodiments, the request can identify the third-party website 120 (e.g., by name, uniform resource locator (URL), and/or other identifier), a user of the client device 102 (e.g., by name, mobile number, email address, or other identifier), and/or include other information. In some embodiments, the request can result from an express user indication to restore an active user session (e.g., via the access application 104 or the cookie agent 105). In other embodiments, the request can be automatically triggered by the cookie agent 105 in response to detecting that the access application 104 has requested, or is receiving, a login page for the third-party website 120. In these embodiments, the cookie agent 105 can prevent the login page from being loaded pending execution of the process 400.

At block 404, the cookie manager 110 receives the request to restore an active user session. At decision block 406, the cookie manager 110 determines whether it is possible to restore an active user session on the third-party website 120. In certain embodiments, the decision block 406 can include determining whether any active user sessions exist for the third-party website 120, for example, by checking the data store 116 for stored cookies relating to the third-party website 120. In addition, in certain embodiments, the decision block 406 can include performing a security steps such as determining whether there are any active user sessions that the user is eligible to access, for example, as a result of the user having initiated the active user sessions.

If it is determined at the decision block 406 that a restore is not possible, for example, as a result of there being no stored cookies for the third-party website 120 and/or no stored cookies that the user is eligible to access, the process 400 ends. In embodiments in which the cookie agent 105 prevents the login page from loading in the access application 104 as described above, the login page may then be permitted to load. In embodiments in which the user expressly indicated the request to restore, the cookie agent 105 can cause an explanatory page or other message to be presented on the client device 102.

If it is determined at the decision block 406 that a restore is possible, the process 400 proceeds to block 408. At block 408, the cookie manager 110 retrieves a cookie corresponding to an active user session on the third-party website 120.

The cookie can be, for example, a cookie that the user is eligible to access as a result of a determination at the decision block 406. It should be appreciated that, in some cases, the active user session may have been established using the client device 102, while in other cases the active user session may have been established using a device that is physically distinct from the client device 102. At block 410, the cookie is sent to the client device 102. At block 412, the cookie agent 105 of the client device 102 receives the cookie.

At block 414, the access application 104 (via the cookie agent 105) communicates with the third-party website 120, via the received cookie, over the active user session. In embodiments in which the login page for the third-party website 120 was prevented from loading pending execution of the process 400 as described above, the block 414 can include the cookie agent 105 sending a request comprising the received cookie to the third-party website 120 and causing a resulting page to be loaded in the access application 104 in place of the login page. After block 414, the process 400 ends.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
automatically receiving, from an agent on a client device that is physically distinct from the computer system, a session cookie corresponding to an active user session on a cloud computing platform, wherein the cloud computing platform requires a valid user name and a valid password for access;
wherein the active user session is previously established on the cloud computing platform in response to the client device logging into the cloud computing platform with valid user credentials for a corresponding user account of a plurality of user accounts, the valid user credentials comprising a particular valid user name and a particular valid password;
storing the session cookie in memory;
via the session cookie, performing web scraping on the cloud computing platform over the active user session without the computer system having to provide the valid user credentials to the cloud computing platform and without the active user session having been torn down, thereby reusing the active user session, the performing web scraping comprising extracting data, from the cloud computing platform, that is particular to the corresponding user account;
storing, in a data store, the extracted data that is particular to the corresponding user account; and
periodically sending a dummy request comprising the session cookie to the cloud computing platform, thereby preserving the active user session.

2. The method of claim 1, comprising:
receiving a request to restore the active user session on a requesting device;
responsive to a determination that the restore is possible, retrieving the session cookie for the active user session; and
transmitting the session cookie to the requesting device, thereby allowing the requesting device to reuse the active user session without the requesting device having to provide the valid user credentials to the cloud computing platform.

3. The method of claim 2, wherein the requesting device is the client device.

4. The method of claim 2, wherein the requesting device is distinct from the client device.

5. The method of claim 1, comprising, responsive to a determination that the computer system is finished collecting data from the cloud computing platform, deleting the session cookie.

6. The method of claim 1, wherein the web scraping comprises simulating a web browser when communicating with the cloud computing platform.

7. The method of claim 1, wherein the agent comprises a web browser extension.

8. The method of claim 1, wherein the agent comprises a native application on the client device that is distinct from an application used to access the cloud computing platform.

9. An information handling system comprising at least one computer processor and memory, wherein the at least one computer processor and memory in combination are operable to implement a method comprising:
automatically receiving, from an agent on a client device that is physically distinct from the information handling system, a session cookie corresponding to an active user session on a cloud computing platform, wherein the cloud computing platform requires a valid user name and a valid password for access;
wherein the active user session is previously established on the cloud computing platform in response to the client device logging into the cloud computing platform with valid user credentials for a corresponding user account of a plurality of user accounts, the valid user credentials comprising a particular valid user name and a particular valid password;

storing the session cookie in memory;

via the session cookie, performing web scraping on the cloud computing platform over the active user session without the information handling system having to provide the valid user credentials to the cloud computing platform and without the active user session having been torn down, thereby reusing the active user session, the performing web scraping comprising extracting data, from the cloud computing platform, that is particular to the corresponding user account;

storing, in a data store, the extracted data that is particular to the corresponding user account; and periodically sending a dummy request comprising the session cookie to the cloud computing platform, thereby preserving the active user session.

10. The information handling system of claim 9, the method comprising:

receiving a request to restore the active user session on a requesting device;

responsive to a determination that the restore is possible, retrieving the session cookie for the active user session; and transmitting the session cookie to the requesting device, thereby allowing the requesting device to reuse the active user session without the requesting device having to provide the valid user credentials to the cloud computing platform.

11. The information handling system of claim 10, wherein the requesting device is the client device.

12. The information handling system of claim 10, wherein the requesting device is distinct from the client device.

13. The information handling system of claim 9, the method comprising, responsive to a determination that the information handling system is finished collecting data from the cloud computing platform, deleting the session cookie.

14. The information handling system of claim 9, wherein the web scraping comprises simulating a web browser when communicating with the cloud computing platform.

15. The information handling system of claim 9, wherein the agent comprises a web browser extension.

16. The information handling system of claim 9, wherein the agent comprises a native application on the client device that is distinct from an application used to access the cloud computing platform.

17. A computer-program product comprising a non-transitory computer-usable medium having computer-readable program code embodied therein, the computer-readable program code adapted to be executed to implement a method comprising:

automatically receiving, from an agent on a client device, a session cookie corresponding to an active user session on a cloud computing platform, wherein the cloud computing platform requires a valid user name and a valid password for access;

wherein the active user session is previously established on the cloud computing platform in response to the client device logging into the cloud computing platform with valid user credentials for a corresponding user account of a plurality of user accounts, the valid user credentials comprising a particular valid user name and a particular valid password;

storing the session cookie in memory;

via the session cookie, performing web scraping on the cloud computing platform over the active user session without having to provide the valid user credentials to the cloud computing platform and without the active user session having been torn down, thereby reusing the active user session, the performing web scraping comprising extracting data, from the cloud computing platform, that is particular to the corresponding user account;

storing, in a data store, the extracted data that is particular to the corresponding user account; and periodically sending a dummy request comprising the session cookie to the cloud computing platform, thereby preserving the active user session.

18. The computer-program product of claim 17, the method comprising:

receiving a request to restore the active user session on a requesting device;

responsive to a determination that the restore is possible, retrieving the session cookie for the active user session; and transmitting the session cookie to the requesting device, thereby allowing the requesting device to reuse the active user session without the requesting device having to provide the valid user credentials to the cloud computing platform.

19. The computer-program product of claim 18, wherein the requesting device is distinct from the client device.

20. The computer-program product of claim 17, the method comprising, responsive to a determination that data collection from the cloud computing platform is finished, deleting the session cookie.

\* \* \* \* \*